(12) United States Patent
Riordan et al.

(10) Patent No.: US 8,301,812 B1
(45) Date of Patent: Oct. 30, 2012

(54) TECHNIQUES FOR PERFORMING HOST PATH DETECTION VERIFICATION

(75) Inventors: Patrick Brian Riordan, West Newton, MA (US); Ian Wigmore, Westborough, MA (US); Xiali He, Upton, MA (US); Arieh Don, Newton, MA (US); Steven M. Goldberg, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/065,549

(22) Filed: Mar. 24, 2011

(51) Int. Cl.
*G06F 13/38* (2006.01)
*G06F 15/173* (2006.01)

(52) U.S. Cl. ............ 710/74; 710/62; 709/225; 709/238; 709/239

(58) Field of Classification Search .................. None
See application file for complete search history.

(56) References Cited

U.S. PATENT DOCUMENTS

| | | | |
|---|---|---|---|
| 7,272,674 B1* | 9/2007 | Nandi et al. ................... 710/38 |
| 7,873,783 B2* | 1/2011 | Takeuchi ...................... 711/114 |
| 7,962,672 B1* | 6/2011 | Martin et al. .................. 710/38 |
| 2002/0156984 A1* | 10/2002 | Padovano ...................... 711/148 |
| 2005/0188243 A1* | 8/2005 | Adams et al. .................... 714/4 |
| 2006/0010227 A1* | 1/2006 | Atluri ........................... 709/217 |
| 2006/0020753 A1* | 1/2006 | Cochran et al. ............... 711/114 |
| 2006/0242156 A1* | 10/2006 | Bish et al. ....................... 707/10 |
| 2007/0016754 A1* | 1/2007 | Testardi ........................ 711/206 |
| 2007/0233983 A1* | 10/2007 | Tanaka et al. ................. 711/163 |
| 2008/0016303 A1* | 1/2008 | Okumoto et al. ............. 711/162 |

OTHER PUBLICATIONS

Contreras, Cesareo, et al., "Techniques for Indicating a Passive Path State for a Device", U.S. Appl. No. 12/924,572, filed Sep. 30, 2010.
"Multi-Machine Atomic Seamless Migration", U.S. Appl. No. 12/750,382, filed Mar. 30, 2010.

* cited by examiner

*Primary Examiner* — Henry Tsai
*Assistant Examiner* — Michael Sun
(74) *Attorney, Agent, or Firm* — Muirhead and Saturnelli, LLC

(57) ABSTRACT

Described are techniques for verifying host path detection. First information from a first data storage system is received indicating a first set of one or more hosts and, for each host in the first set, which one or more devices of a first device set of the first data storage system are accessible to said each host in the first set over one or more associated paths to the first data storage system. Second information and the first information are received at a second data storage system. First processing is performed at the second data system to determine whether each host included in the first information has successfully completed path detection with respect to a second device set for the second data storage system.

19 Claims, 9 Drawing Sheets

TECHNIQUES FOR PERFORMING HOST PATH DETECTION VERIFICATION

BACKGROUND

1. Technical Field

This application generally relates to data storage systems, and more particularly to techniques used for communicating with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such for path selection and management of the multiple paths, may be handled by a device driver. When the host issues an I/O operation, it may be received by a device driver which facilitates sending and/or receiving transmissions between the application and the data storage system.

SUMMARY OF THE INVENTION

In accordance with one aspect of the invention is a method of verifying host path detection comprising: receiving first information from a first data storage system, said first information indicating a first set of one or more hosts and, for each host in the first set, which one or more devices of a first device set of the first data storage system are accessible to said each host in the first set over one or more associated paths to the first data storage system; receiving second information at a second data storage system, wherein the second data storage system also receives the first information from the first data storage system, said second information indicating a second set of one or more hosts and, for each host in the second set, which one or more devices of a second device set of the second data storage system are accessible to said each host in the second set over one or more associated paths to the second data storage system, wherein each of said devices in the first device set has an associated device in said second device set; and performing first processing at the second data system to determine whether each host included in the first information has successfully completed path detection with respect to said second device set for the second data storage system, said first processing using information including the first information, the second information, first mapping information and second mapping information, the first mapping information indicating, for each device in the second device set, through which one or more ports of the second data storage system said each device is accessible, and the second mapping information indicating, for each device in the first device set, an associated device in said second device set. The first processing may further include determining, using the first information by the second data storage system, which devices in the first device set are accessible to each host in the first set; and traversing the second information to determine whether each host in the first set able to access a first device in the first device set is also able to access a second device of the second device set associated with the first device over one or more paths or ports of the second data storage system, wherein said one or more paths or ports are indicated in the first mapping information and the second mapping information indicates that the first device is associated with the second device. The first information and said second information may be created as a result of a plurality of hosts included in the first set and also included the second set issuing commands to said first data storage system and said second data storage system to perform discovery processing and to register with the first and the second data storage systems as using one or more paths to access one or more devices included in the first device set and the second device set. The commands issued to create said first information and said second information may include reservation registration commands issued by the plurality of hosts to register with the first and the second data storage systems as using particular paths to access devices included in the first device set and the second device set. Each of the reservation registration commands may be a vendor unique SCSI command. Each of the reservation registration commands may include a key used to uniquely identify a sending host. Each of the reservation registration commands to register a first path to a first device of either said first device set or said second device set may be performed by a host as part of processing to establish the first path as a recognized path for sending communications from said host to the first device. Data from each device of the first device set may be migrated to its associated device in the second device set as indicated by the second mapping information. The second mapping information may be supplied using one or more parameters of a migration session. Prior to the second data storage system receiving the first information from the first data storage system, the method may further comprise issuing a command from the second data storage system to the first data storage system instructing the first data storage system to initialize a table including the first information; and sending a message from the first data storage system to hosts of the first set causing the first set of hosts to re-register with the first data storage system as being able to access one or more devices of the first set over one or more paths or ports of the first data storage system thereby creating a new instance of the first information in the table. Prior to performing said first processing, a first set of paths for said first set of devices may be in an active state, said first set of paths being between the first set of hosts and target ports of the first data storage system, and a second set of paths for the second set of devices may be in a passive state, said second set of paths being between the first set of hosts and target ports of the second data storage system. The method may include migrating data from said first device set to the second device set; determining that each host included in the first information has successfully completed path detection with respect to said second device set; and performing second processing to change said first set of paths to a passive state and said second set of paths to an active state. A path to a device in the active state may indicate that the path is used to successfully process I/O operations directed to the device. A path to a device in the passive state may indicate that the path is not to be used for sending I/O operations to the device. A determination by said first processing that a first host has successfully completed path detection with respect to the second device set thereby establishing one or more paths to each device in said second device set as recognized paths to said each device may be in accordance with completion of one or more expected commands for path detection performed by the first host and in accordance with what one or more ports through which said each device is visible to said first host. The one or more expected commands may be performed as part of initially configuring connectivity between said first host and the first and second data storage systems. The first set of devices and said second set of devices may be logical devices.

In accordance with another aspect of the invention is a computer readable medium comprising code stored thereon for verifying host path detection, the computer readable medium comprising code for: receiving first information from a first data storage system, said first information indicating a first set of one or more hosts and, for each host in the first set, which one or more devices of a first device set of the first data storage system are accessible to said each host in the first set over one or more associated paths to the first data storage system; receiving second information at a second data storage system, wherein the second data storage system also receives the first information from the first data storage system, said second information indicating a second set of one or more hosts and, for each host in the second set, which one or more devices of a second device set of the second data storage system are accessible to said each host in the second set over one or more associated paths to the second data storage system, wherein each of said devices in the first device set has an associated device in said second device set; and performing first processing at the second data system to determine whether each host included in the first information has successfully completed path detection with respect to said second device set for the second data storage system, said first processing using information including the first information, the second information, first mapping information and second mapping information, the first mapping information indicating, for each device in the second device set, through which one or more ports of the second data storage system said each device is accessible, and the second mapping information indicating, for each device in the first device set, an associated device in said second device set. The code for first processing may further comprise code for determining, using the first information by the second data storage system, which devices in the first device set are accessible to each host in the first set, and traversing the second information to determine whether each host in the first set able to access a first device in the first device set is also able to access a second device of the second device set associated with the first device over one or more paths or ports of the second data storage system, wherein said one or more paths or ports are indicated in the first mapping information and the second mapping information indicates that the first device is associated with the second device. The first information and said second information may be created as a result of a plurality of hosts included in the first set and also included the second set issuing commands to said first data storage system and said second data storage system to perform discovery processing and to register with the first and the second data storage systems as using one or more paths to access one or more devices included in the first device set and the second device set.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
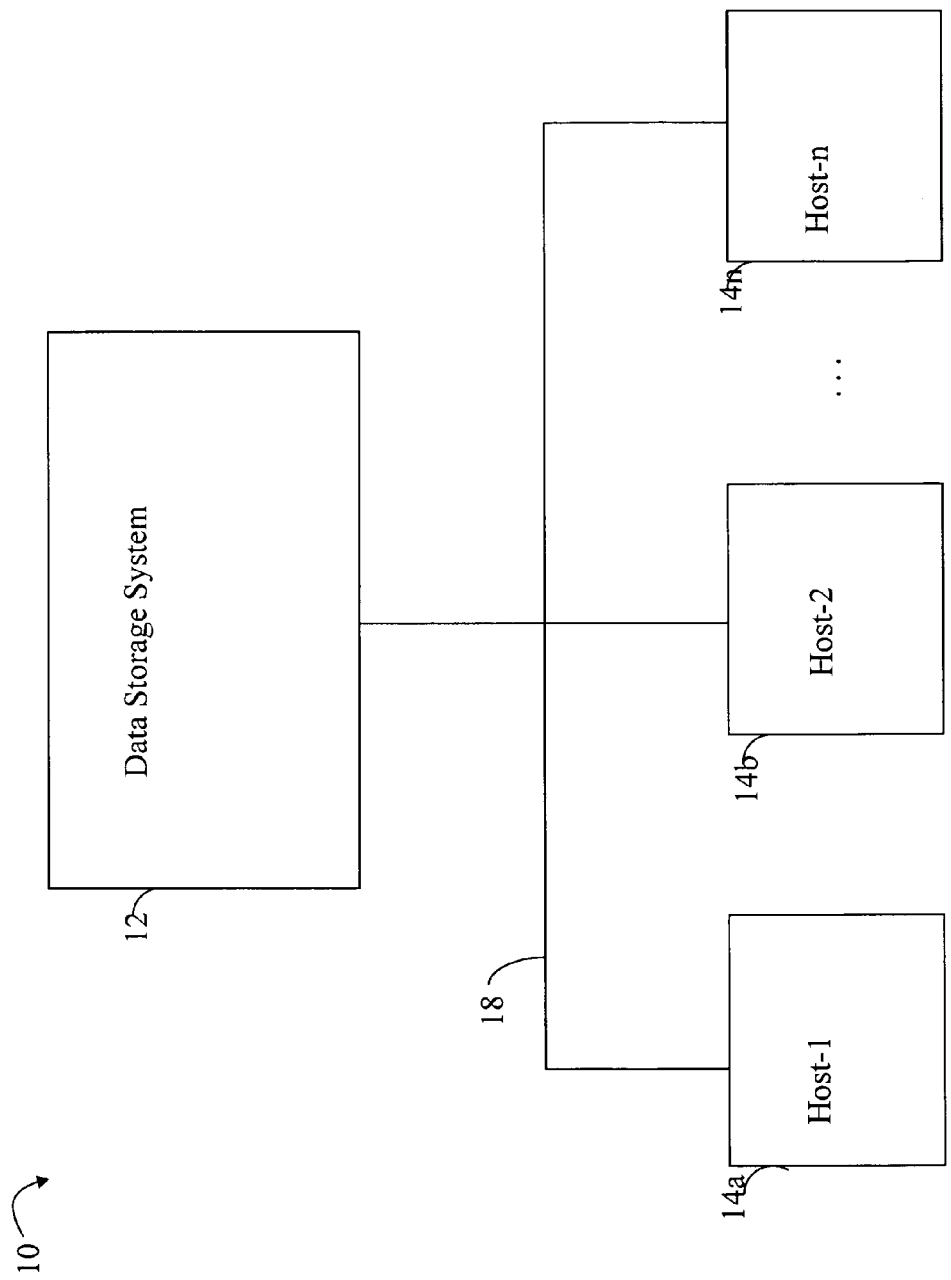
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with the embodiment.

Figure 2A:
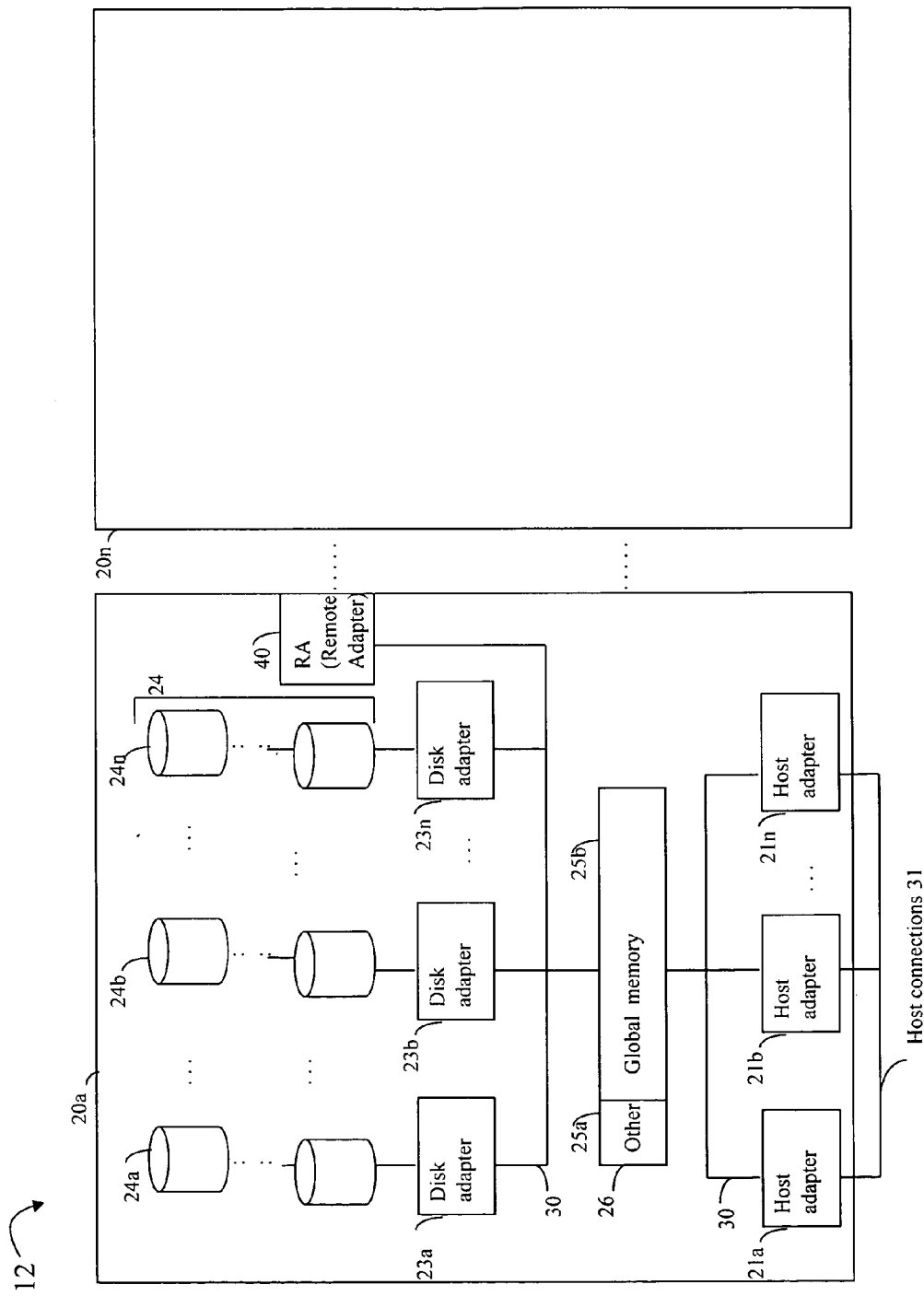
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
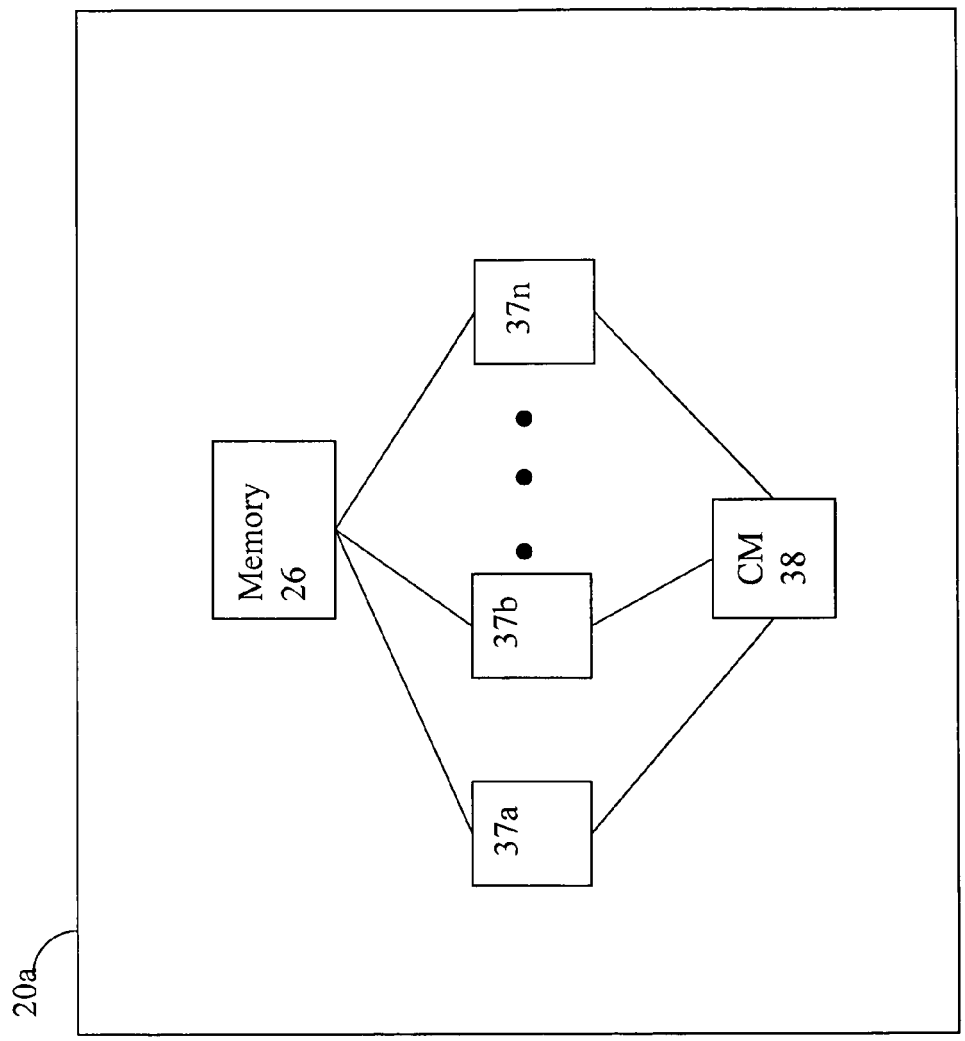
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system.

Figure 3:
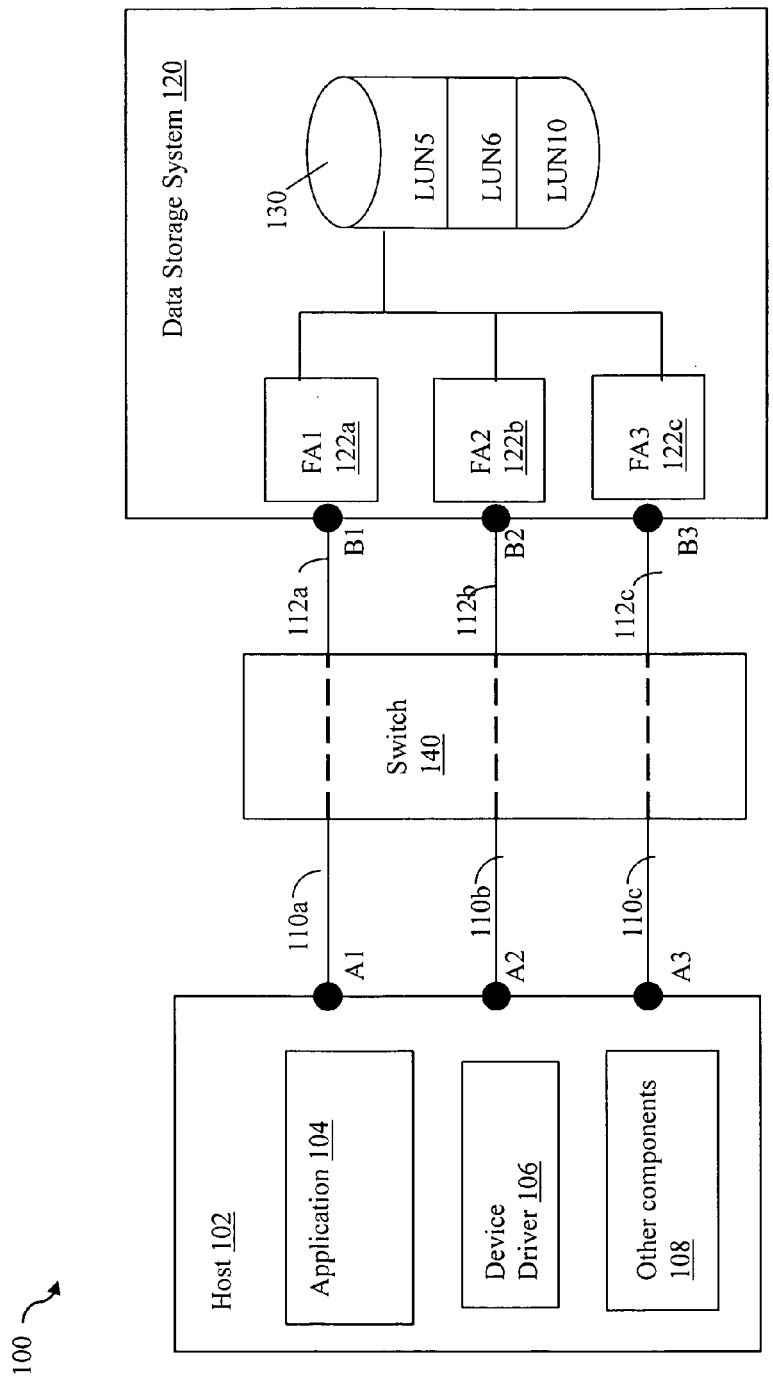
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single data storage system, and a fabric including a single switch for purposes of simplicity to illustrate the techniques herein.

The host 102 may include an application 104, driver 106 and other components 108. An I/O operation from the application 104 may be communicated to the data storage system 120 using the driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The driver 106 may include functionality to perform any one or more different types of processing such as related to encryption, multipathing, mirroring, migration, and the like. For example, the driver 106 may include multipathing functionality for management and use of multiple paths. For example, the driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The driver 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the driver 106 and also below the driver 106. For example, application 104 may issue an I/O operation which is communicated in a call stack including an LVM, the driver 106, and an FC or SCSI driver.

The data storage system 120 may include one or more physical data storage devices, such as device 130, where each such device is configured into one or more LUNs as described above. Each of the LUNs of the device 130 may be configured to be accessible to the host through multiple paths. For example, all LUNs of 130 may be accessible using ports of the three front end directors or interfaces 122a-122c, also denoted respectively FA1, FA2 and FA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the driver 106 may also perform other processing in addition to load balancing in connection with path selection. The driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. Each of the LUNs of the device 130 may be accessible over three paths—a first path represented by A1-B1, a second path represented by A2-B2 and a third path represented by A3-B3.

Although the techniques herein may be used in an embodiment in which the driver resides on a host and manages data storage devices on a data storage system, the driver may also manage data storage devices that are directly attached to the host.

Figure 4:
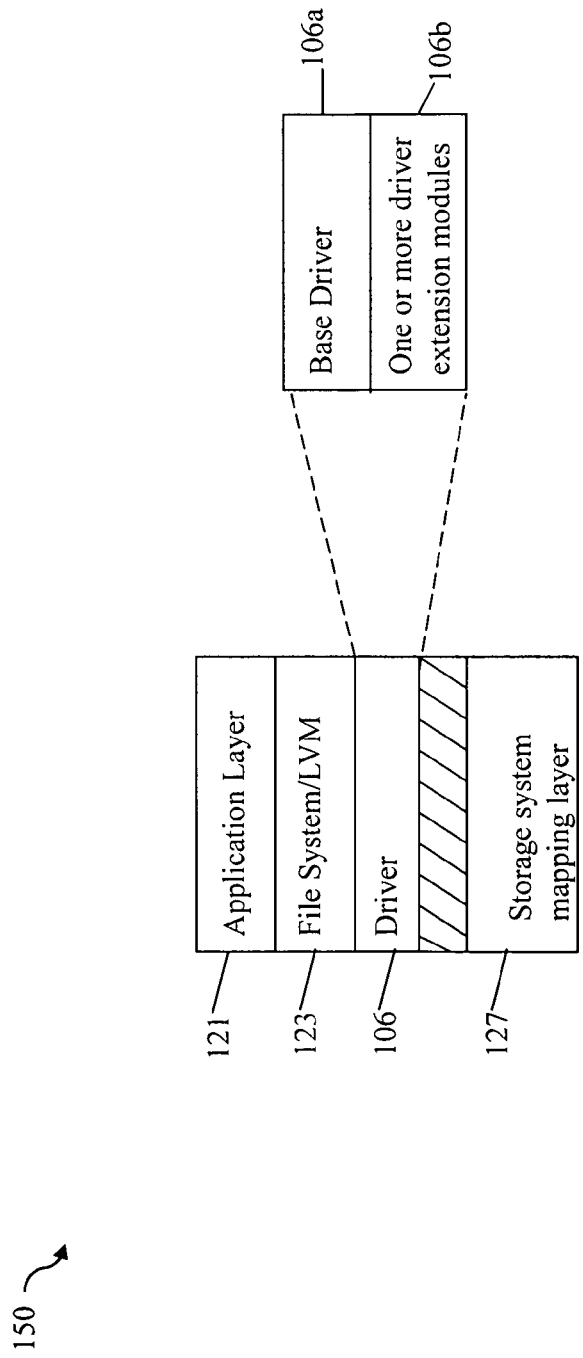
FIG. 4 is an example of different software layers that may included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the driver 106 of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to a LUN which the host may perceive as corresponding to a physical device address (e.g., the address of one of the disk drives) within the storage system 12. Below the file system/LVM layer 123 is the driver 106 which handles processing of the I/O received from layer 123. The driver 106 may include a base driver 106a and one or more driver extension modules 106b. The driver 106 may be included in a commercially available product such as EMC® PowerPath® software. Functionality for performing multipathing operations such as may be performed by EMC® PowerPath® software may be included in one of the extension modules 106b such as a multipath (MP) extension module. As described above, the MP extension module may perform processing in connection with multiple path management and selecting one of a plurality of possible paths for use in connection with processing I/O operations and communicating with the data storage system, such as 120 of FIG. 3. The layer 123 may provide for mapping a LUN as presented by the data storage system to the host to another logical data storage entity that may be used by the application layer 123.

In some embodiments, the data storage system 120 may be an intelligent data storage system having its own mapping layer 127 such that the LUN passed from the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may executed in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices, such as LUNs of the data storage system. Such I/O operations may be directed to the driver 106 after passing through any intervening layers such as layer 123.

In connection with an embodiment in accordance with techniques herein, communications between an initiator port of the host and a target port of a data storage system may include those related to I/O operations and others related to host control operations. I/O operations may include, for example, read and write operations. Host control operations may include those commands which are not performing I/O with respect to a data storage device (e.g., LUN) and include SCSI commands such as, for example, inquiry, mode sense, and read capacity.

A path to a device may have an associated state referred to as passive or inactive indicating that the path is not in use or available for I/O operations directed to that particular device. When a path is in such a state, the path may not be used for sending I/O operations directed to that device. When the path is in the passive state, the data storage system including the device may return an error status indicating a failure for any I/O operations which are sent over the path and directed to the device. However, the same path may be successfully used for I/O operations directed to other devices and the device may be accessible through one or more other paths. The passive state may indicate that the data storage system is currently not accepting I/O operations for the device on that particular path. When in this passive state, the device and path (including components such as ports, physical connections, and the like) are healthy and operable. However, the passive state of a path to a particular device (e.g., LUN) indicates restricted usage of the particular path with respect to I/O operations directed to the device. Thus, the state of passive may be associated with a particular device and path. In contrast to the passive state for a path to a device may be an active state. An active state with respect to a path and a device may refer to the state when a path is used for sending I/O operations to the device. A path for a device may transition between active and passive states, as well as possibly other optional states that may be included in an embodiment. When in the passive state with respect to a particular path and LUN combination, the path may be designated as inactive or not available for sending I/O operations to the LUN. When a path is in the passive state with respect to a particular LUN, the path may be indicated as available only for use in performing host control operations (e.g., inquiry, mode sense, read capacity, etc.) directed to the LUN. If an I/O operation is received over a path for a LUN and the path and LUN combination is in the passive state, the data storage system responds with an error message (e.g., responds with a check condition status code) and does not perform the requested I/O operation. When a path is in the active state with respect to a particular LUN, the path may be used to perform host read/write I/O operations (e.g., SCSI read or write operations to access host data) as well as host control operations (e.g., respond to inquiry and mode sense SCSI commands from the hosts).

In connection with the SCSI protocol and standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another FA having a port with a network address) characterized as a target, destination, receiver, or responder. Each physical connection of a path may be between a first endpoint which is a port of the host (e.g., such as of a host bus adapter) and a second endpoint which is a port of an FA in the data storage system.

Initially, a data storage system may be configured for use by one or more hosts. Part of this configuration processing includes defining what LUNs of the data storage system are accessible or visible to the host over which one or more paths. Discovery processing may then be performed by the host to discover all LUNs accessible to the host and over what one or more paths. As part of discovery processing, the host may issue commands to the data storage system to discover what LUNs are visible to the host over what one or more paths, discover information about each LUN, and the like. For example, the host may issue a first command from a host initiator port (e.g., Report LUNs) to obtain a list of all LUNs visible from the host initiator port. Subsequently, the host may also send a sequence of one or more commands to each LUN from the host initiator port to gather additional information about the LUN and path, perform a path test to determine whether a LUN is currently accessible to the host over the path such as for I/O operations, and the like. For example, the host as initiator may send the following sequence of SCSI commands over a path, such as from a host port to a target data storage system port, as part of discovery processing:

1. Test unit ready (TUR)
2. Standard Inquiry page 0
3. read capacity
4. mode sense
5. Inquiry VPD page 0x83

In the foregoing command sequence, TUR provides a means to check if the logical unit is ready, mode sense reports information about the LUN to the initiator, read capacity obtains storage capacity information about the LUN, and the standard inquiry page 0 provides general information about the LUN and also serves as a path test to determine whether the LUN is accessible to the host over the path from the host initiator port to the data storage system target port. With the standard inquiry page 0 command, the page field of the SCSI command data block is set to 0 and the EVPD field of the SCSI command data block is set 0 to return a standard set of data as described in more detail elsewhere herein. Inquiry VPD (Vital Product Data) page 0x83 may also be used in a manner similar to the standard inquiry page 0 command (e.g., denoted in 2 above) to obtain information about the LUN. With the inquiry VPD page 0x83 command, the page field of the SCSI command data block is set to 0x83 and the EVPD field of the SCSI command data block is set 1. More generally, the foregoing command sequence illustrates an exemplary sequence performed in an embodiment as part of discovery processing to recognize or establish a path over which a LUN may be accessed. After the foregoing has been successfully executed, the path may be characterized as a recognized path by the host over which to access the LUN. The foregoing sequence of 5 instructions represents one sequence of commands that may be expected to be completed successfully in order for a path (between the host or initiator and the data storage system or target) to be considered recognized or established.

In an embodiment in accordance with techniques herein, an additional one or more commands may also be included in the expected command sequence of instructions as part of path recognition by the host. The additional commands may be in accordance with processing performed by the driver including multipathing functionality as described herein. For example, the driver may issue commands in connection with SCSI reservation protocol exchanges. In this case, path recognition for a particular device may also include successfully executing a SCSI reservation registration command. The reservation registration command may be a vendor-unique command issued by the host to register for subsequent reservations on a particular path for a device where the path may be used to subsequently send commands to the device over the path. In connection with techniques herein as described in more detail elsewhere, after the host successfully executes the reservation registration command in the embodiment using the multipath functionality, this may be an indication to the data storage system that the host has recognized the associated path. In other words, the foregoing sequence of commands performed with respect to a particular LUN and path for accessing that LUN indicate, when executed successfully, that the path is recognized or established by the host for use in accessing the LUN.

In an embodiment in accordance with techniques herein, the multipathing functionality as may be embodied in the driver described above may determine multiple paths to the same LUN using the information returned from the standard inquiry page 0 commands. An embodiment may insulate an application from the fact that multiple paths may be in use by presenting the application with a single device. The driver may then select a path for use with an I/O as described above should that device be accessible on multiple paths. Subsequently, as the number of paths and the availability of the paths may change over time, the application may also be unaware of such changes so long as at least a single path is available to the device.

At times, it may be desirable to indicate temporarily that a particular path is not to be used for I/Os directed to a particular device, such as a particular LUN. The path may be used for sending I/Os to other devices but it may be desirable to disable or render the path inactive for I/Os for the device. In this case, the device and path are healthy. However, the particular combination of device and path specify that the path is not to be used for I/O operations for the device. The path may be used in connection with other SCSI commands for the device, but not for I/O operations. The foregoing may be characterized as a passive or inactive state with respect to the path for the particular device. It may be desirable to transition into such a state with respect to the path for the device for a variety of different uses. Some examples are described in more detail in following paragraphs where it may be desirable to render a path as passive or inactive with respect to a particular device but not for other devices, and also where it may be desirable to transition a path from the from the passive state to the active state. One exemplary use described in more detail below is in connection with data migration.

As described above, a host may perform an expected sequence of commands issued to the data storage system for a LUN and one or more paths over which the LUN may be accessed as part of discovery processing. The data storage system may track and detect when such a sequence of commands has been received from the host for the LUN over each such path in order to determine when the host has completed path recognition for the LUN. For example as described above in one embodiment, a path to a LUN may be recognized by the host when the host has successfully completed execution of the SCSI commands transmitted over the path to the data storage system including the LUN: TUR, standard inquiry page 0, read capacity, mode sense, inquiry VPD page 0x83 and also possibly one or more other commands, such as the SCSI reservation registration command. It should be noted that the path for which recognition is performed is the path over which such commands are transmitted to the data storage system from the host (e.g. more generally to the target from the initiator). After the data storage system has detected successful completion of the expected sequence of commands from the host indicating path recognition (e.g. indicating that the host has successfully completed path detection), the data storage system may at any subsequent point in time transition the path for this LUN to the passive or inactive state. At a later point in time, the data storage system may set the state of the path for the LUN from passive to active.

It should be noted that the determination of when a device is established or recognized on a particular path by the host (e.g., indicating that the host has successfully completed path detection for the device) may be made with respect to any sequence of expected commands. After such commands have been successfully executed as detected by the data storage system, the data storage system may determine that the host and driver have recognized the path for the LUN. At any point subsequent to path recognition for a LUN, the data storage system may set the path for the LUN to the passive and/or active states as needed. As described above with respect to the passive state of a path for LUN, any subsequent I/Os which are directed to the LUN and transmitted over the path result in a response to the host indicating I/O failure. When the data storage system decides to transition the path for the LUN out of the passive state, the data storage system may no longer automatically fail all I/O operations received on the path for the LUN and may send an indication to the host (such as using one or more commands and/or response messages) regarding the path state change (such as the state change from passive to active).

An example will now be described in connection with data migration of when it may be desirable to render a path as passive or inactive with respect to a particular device but not for other devices in an embodiment in accordance with techniques herein. Furthermore, the techniques herein perform processing to determine when a host has successfully completed path detection verification.

Figure 5:
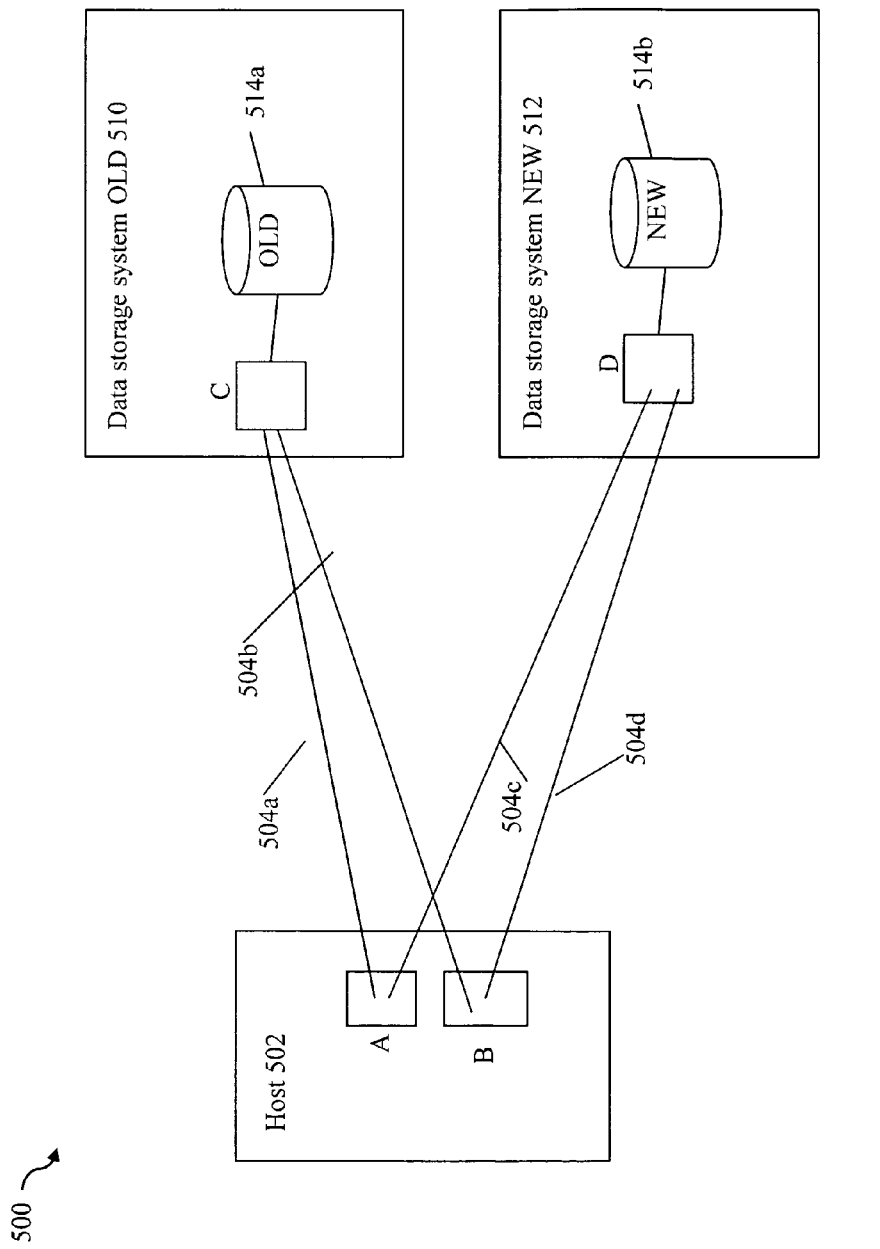
FIGS. 5-7 are examples illustrating use of the techniques herein in connection with migration processing that may be performed in an embodiment.

As an example, consider the arrangement of FIG. 5. The example 500 includes a host 502, data storage system 510 (OLD), and data storage system 512 (NEW). Data storage system 510 includes device 514a and data storage system 512 includes device 514b. In the example 500, data may be in the process of being migrated from device 514a to device 514b such as may be the case where a customer is upgrading from data storage system 510 to 512. Part of this process may include migrating the data to the newer system 512 and its device 514b from device 514a. During this migration process, the host 502 may be online and accessing data of the systems 510 and 512. The host has recognized and uses paths 504a and 504b to access device 514a. Similarly, the host has recognized and uses paths 504c and 504d to access device 514b. Paths 504a and 504c may use the same host initiator port A and paths 504b and 504d may use the same host initiator port B. Device 514a may be mapped to port C (e.g., exposed or visible to an initiator over port C) so that port C is the target port for paths 504a and 504b. In a similar manner, device 514b may be mapped to port D so that port D is the target port for paths 504c and 504d.

Devices 514a and 514b are configured to both have a same first device identifier such as same world-wide unique name (WWN). However, this may be only temporary until the migration has completed and then device 514a is brought offline. In a similar manner, each of the data storage systems 510 and 512 are configured to have the same data storage system identifier. However, the data storage systems 510 and 512 are configured to ensure that each port thereof has a unique port identifier. That is, each port of the systems 510 and 512 is associated with a port number that uniquely identifies or distinguishes the port from all other port identifiers associated with ports of the systems 510 and 512. During the migration process, the host, and the multipath module of the driver of the host, is able to distinguish between the paths to the devices 514a and 514b based on the unique combination of data storage system identifier and data storage system target port identifier even though the paths may use a same host initiator port. In other words, ensuring that the data storage system port identifiers across systems 510 and 512 are unique or distinguishable with respect to one another allows the host to differentiate between the four paths to the devices 514a and 514b.

During the migration process, the host may have access to both devices 514a and 514b on the illustrated paths. However, it may be desirable to disallow I/O operations to the new device 514b until the data migration process is complete. Setting the two paths 504c and 504d to the passive state with respect to I/O operations for device 514b is one way in which this may be achieved using techniques described in following paragraphs. During the migration, the paths 504a and 504b may be used in connection with I/O operations from the host and remain in the active state while paths 504c and 504d are in the passive state. After the migration, the paths 504c and 504d transition from the passive to an active state where I/O operations for the device 514b are allowed. After the migration, the paths 504a and 504b may be set to passive. Setting paths 504c and 504d for device 514b to the passive state during the migration and communicating such state information to the driver of the host performing multipath management allows the driver to access the appropriate device 514a to service host I/Os. Subsequently, after the data has been migrated, the driver, or more generally the host, may detect the transitioning of paths 504c and 504d out of the passive state to the active state based on information regarding path status for devices returned from the data storage system. After the data is copied to device 514b and the paths 504c, 504d are set to active and paths 504a, 504b are set to passive, host I/Os may be directed to the device 514b in accordance with those paths indicated as active.

Therefore, as part of processing performed in connection with the migration processing illustrated in FIG. 5, the host 502 may issue commands for discovery processing and to detect paths to the devices 514a, 514b. The foregoing processing may include setting the state of paths 504a, 504b to device 514a to active and the state of paths 504c, 504d to passive, copying the data from 514a to 514b (such as may be controlled by the data storage systems transparently to the host), having the host successfully performing path detection for devices 514a, 514b, and then performing a switchover with respect to devices 514a, 514b. The switchover includes setting the state of paths 504a, 504b of device 514a to passive and the state of paths 504c, 504d of device 514b to active whereby subsequent I/O commands from host 502 are now serviced using device 514b rather than device 514a.

In an embodiment when performing migration processing, it may be desirable to have the new data storage system 512 perform processing to detect when the host 502 has successfully completed path detection and recognition of paths 504c, 504d, for device 514b. Verification of such successful completion may be required prior to proceeding with subsequent steps of the migration process such as the switchover described above. Determining or verifying when such successful path detection has been completed on the system 512 may be made more complex in most systems by the fact that such systems typically have the same devices exposed to multiple hosts. Such verification processing includes, for example, ensuring that host 502 has completed path detection successfully for multiple paths and that particular ones of those paths—such as 504c and 504d—are to the new data storage system 512. Therefore, such verification processing can be time consuming and costly in terms of resources utilized.

What will now be described is an automated way of the new data storage system 512 determining or verifying that all paths between system 512 and the host 502 have been successfully detected by the host 502. One such use of host path detection verification by a data storage system is in connection with the data migration processing described. If the system 512 determines that the host 502 has not completed the foregoing, the switchover step of the migration processing is not allowed to proceed. As described above in one embodiment, the reservation registration command may be issued by the host for each path over which a host will subsequently access a device. For example, the host 502 may issue a reservation registration command over each of the paths 504a, 504b to data storage system 510 and over each of 504c, 504d to data storage system 512. The host may perform this command as part of path detection and discovery processing as an expected sequence of commands and may thereby indicate to the receiving data storage system that when this reservation registration command has been completed with respect to a particular device and path combination on the data storage system side, the issuing host has successfully completed path detection for that particular device and path. Thus, as described below, determining when the host has issued an expected set of reservation registration commands may be used in determining or verifying when the host has successfully completed host path detection.

In one embodiment, the reservation registration command may be a vendor-unique SCSI command which includes a host-unique key or identifier used by the receiving data storage system to uniquely distinguish and differentiate between all hosts using the data storage system. Generally, the key may be any numeric, alphabetic, or alphanumeric identifier providing the desired degree of uniqueness to enable differentiation between hosts. In this way, even though the data storage system receiving the reservation registration command may not know the host which sent the command, the receiving data storage system is able to identifying which set of multiple registration reservation commands are issued by the same host. Each host may issue a reservation registration command to a data storage system for each device exposed or visible to the host, and for each such device, and on all paths over which the device is visible.

When the data storage systems 510 and 512 receive a reservation registration command from the host 502, an entry may be created in a reservation registration table as maintained in each of the data storage systems 510, 512.

Figure 6:
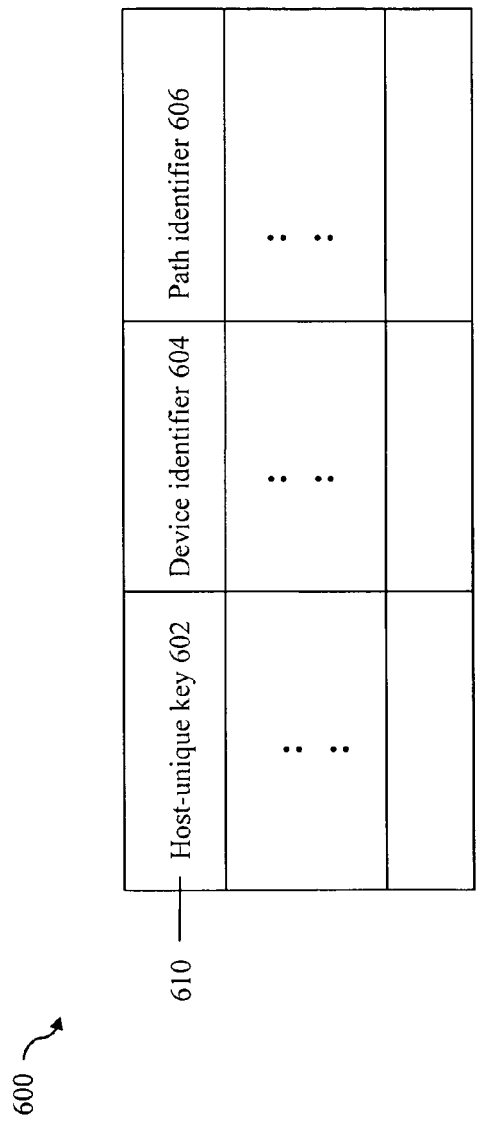

Referring to FIG. 6, shown is an example of a reservation registration table that may be used in an embodiment in accordance with techniques herein. The example 600 includes a table as may be created and maintained on each of the data storage systems 510, 512. The table may include an entry 610 corresponding to information recorded for each reservation registration command received from a host. Each entry 610 may include a host-unique key 602, device identifier 604 and path identifier 606. The host-unique key 602 may be the key which, as described above, is included in the reservation registration command information and uniquely identifies a particular sending host. The device identifier 604 may bean identifier of the logical device, such as the LUN or logical volume (LV) on the data storage system. The path identifier 606 may identify the path over which the reservation registration command was received on the receiving data storage system. The path identifier 606 may include information identifying the sending host port or initiator port and the receiving data storage system port or target port. Therefore, within the table 600, all entries having the same value in field 602 indicate the set of devices and associated paths for a same host having the key of field 602. In a similar manner, all entries of the table having the same value in field 604 indicate reservation registrations for the same device. Each of the data storage systems 510 and 512 may create and maintain its own instance of a reservation registration table as just described.

It should be noted that the device identifier of field 604 may be the WWN or other device identifier assigned to 514a and 514b above. Alternatively, the device identifier of 604 may be a local device identifier of the data storage system (having the particular reservation registration table). For example, device 514a may have a first ID identifying a particular LUN or LV within the system 510 and the first ID may be the value included in the field 604 of each entry in the reservation registration table 600 of the system 510. Similarly, device 514b may have a second ID identifying a particular LUN or LV within the system 512 and the second ID may be the value included in the field 604 of each entry in the reservation registration table 600 of the system 512. The device identifiers "first ID" and "second ID" may be specified as parameters of a migration session indicating the particular devices of the source data storage system 510 of the migration and the target data storage system 512 of the migration.

Prior to performing the switchover command (e.g., which may be a command issued from the host causing the target devices of the new data storage system 512 to be used to service subsequent I/Os rather than the source devices of the system 510), the new data storage system 512 may perform processing to ensure that the host 502 has successfully completed desired path detection and recognition processing. In one embodiment, the system 512 may perform this processing at a point in time by examining the current contents of its reservation registration table at that point in time to determine whether all desired reservation registration commands have been received (thereby indicating that the host 502 has successfully completed path detection or recognition processing for these paths).

Figure 7:
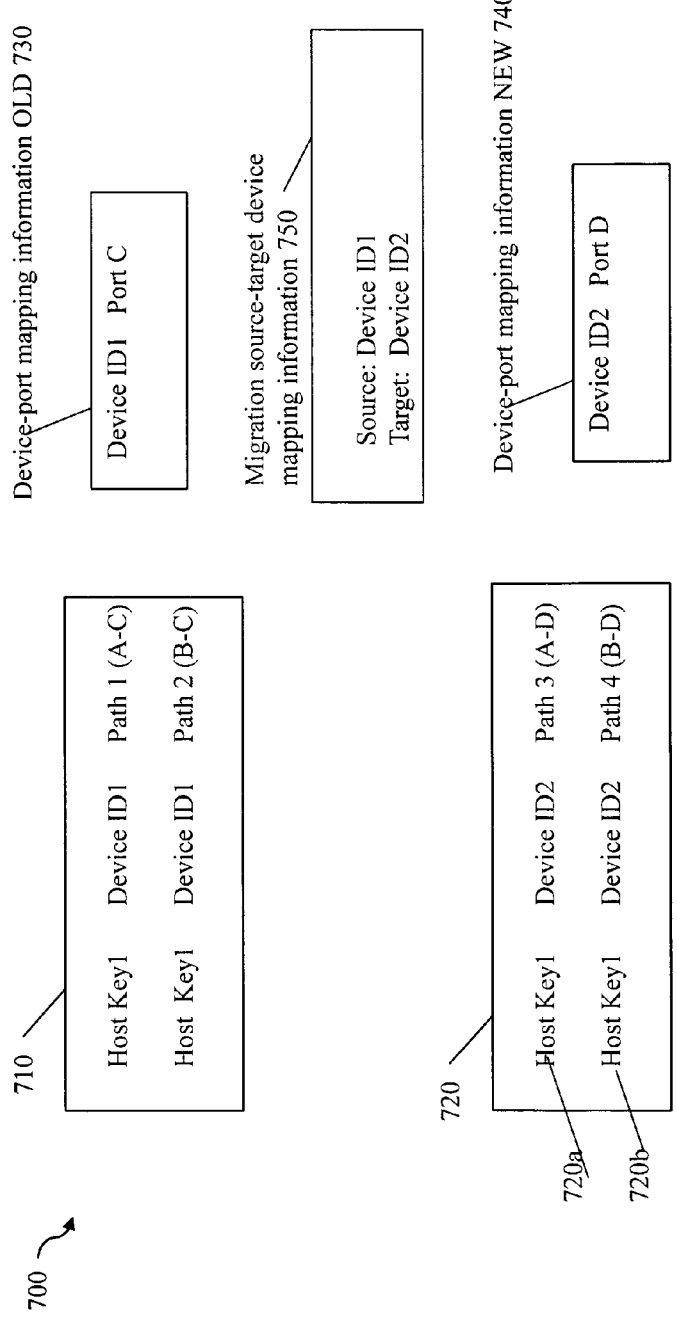

With reference to FIG. 7, processing will now be described as may be performed by the new data storage system 512 in an embodiment in accordance with techniques herein. In the example 700, element 710 may represent the information included in the reservation registration table of the old data storage system 510, element 730 may represent device-port mapping information of the old data storage system 510, element 720 may represent the information included in the reservation registration table of the new data storage system 520, element 740 may represent device-port mapping information of the new data storage system 512 and element 750 may represent the migration source-target device mapping information. In this example 700 with reference back to FIG. 5, Host Key1 denotes the key associated with host 502, Device ID1 represents the device identifier associated with device 514a, Device ID2 represents the device identifier associated with device 514b, Port C denotes the port of system 510, and Port D denotes the port of system 512. The mapping information 730, 740 may identify which of the devices of the data storage systems 510, 512 are exposed or accessible to a host using which one or more ports of the data storage systems 510, 512. For example, mapping information 730 indicates that device 514a of system 510 is accessible on port C of the system 510 and mapping information 740 indicates that device 514b of the system 512 is accessible on port D of system 512. The migration source-target device mapping information 750 may indicate a first identifier Device ID1 of a device (LUN or LV) within the system 510 whose data is to be migrated to another device having the second identifier Device ID2. With reference to FIG. 5, Device ID1 may be associated with device 514a, the source device of data migration, and Device ID2 may be associated with device 514b, the target device of the data migration. The reservation registration table 710 of system 510 indicates that two reservation registration commands have been received from host 502 (e.g., having host Key 1 as its key) for device 514*a* (e.g. having Device ID1) on path 1 (e.g., from port A to C) and on path 2 (e.g., from port B to C). The reservation registration table 720 of system 512 indicates that two reservation registration commands have been received from host 502 (e.g., having host Key11 as its key) for device 514*b* (e.g. having Device ID2) on path 3 (e.g., from port A to D) and on path 4 (e.g., from port B to D).

As part of processing performed for host path detection verification, the data storage system 512 may issue a command to the old data storage system 510 requesting that the system 510 return to system 512 the information currently included in the reservation registration table 710 of the system 510 as illustrated. Using the returned information of table 710, the new data storage system 512 may then determine which hosts are registered on the old system 510 for which devices. In other words, the information of the table 710 is processed to identify a first list of hosts based on the unique host key values and, associated with each host key, a list of one or more source devices for which that host has registered on the system 510. Using the mapping information 750, for each source device of system 510 identified (e.g. for which at least one host has registered at least one path), the associated or corresponding target device of system 512 may be determined. The new system 512 may assume that each device on its system as included in mapping information 750 is to be made available or accessible on all of its mapped ports as indicated in the information 740. Thus, the system 512 may perform processing to determine, for each host and identified devices in the first list, what information is expected to/should be included in its reservation registration table 720 in order to conclude that the host 502 has successfully completed path detection necessary for the switchover to occur.

With reference to FIG. 7, the system 512 may determine, using mapping information 740, 750 and the first list of extracted information (e.g. registered hosts and associated devices) from 710, that its table 720 is expected to include one or more paths from host 502 to device 514*b* (having Device ID2) where each of the one or more paths access device 514*b* using target port D of the system 512. The table 720 is searched for one or more paths matching the foregoing criteria of host key, target device (of the system 512), and target port (of the system 512) and two entries 720*a*, 720*b* of table 720 are located. The two entries 720*a*, 720*b* of table 720 that match the criteria represent, respectively, a first path for host 502 to device 514*b* (having Device ID2) where the first path includes target port D from source port A (of the host 502) and a second path for host 502 to device 514*b* where the second path includes target port D and source port B (of the host 502). Therefore, it may be determined by data storage system 512 in this example that the host 502 has successfully completed path detection or recognition for data storage system 512 via the paths currently registered as indicated by the reservation registration table 720.

In the foregoing embodiment, the new data storage system 512 may determine whether the host 502 has successfully completed path detection with respect to system 512 for the migration process in order to determine whether to perform the switchover. The host path detection verification may be performed using information indicating which hosts are registered for which devices on the old data storage system 510 (e.g., the first list of extracted information determined using table 710), using device port mapping information 740 for the system 512 indicating what devices of 512 are visible or accessible over which ports of 512, using the migration source-target device mapping information 750, and using the current contents of the reservation registration table 720 of system 512 (e.g., indicating what hosts are currently registered for which devices over what paths in the system 512). From the foregoing, the data storage system 512 may determine if each host has successfully completed registration (and thus path detection) for each target device on the system 512. As described above, this may be desirable prior to changing the path states as part of the switchover processing.

It should be noted that the new data storage system 512 may force a re-initialization or refreshing of the reservation registration table of the old data storage system 510 prior to performing the foregoing processing. Alternatively, the system 512 may proceed as described above without first causing this re-initialization. In an embodiment performing this re-initialization, the system 512 may issue a re-initialization command to the system 510 prior to determining whether the hosts have successfully completed reservation registration and thus path detection for the system 512. In response, the system 510 may clear its reservation registration table 710 and issue a second command to the host 502 causing host 502 to re-register its device reservations on the system 510. The system 510 may issue this second command to all hosts currently connected to the system 510 thus clearing any stale or old entries from the table 710 (e.g, clearing entries associated with hosts currently not connected to the system 510) when re-registration is complete. For example, in one embodiment, the system 510 may issue a SCSI check condition to the hosts with respect to all of its devices causing all receiving hosts to re-register their device reservations with the system 510. It should be noted that check condition sent from system 510 to the hosts represents the system 510 feigning that it has received a SCSI reset command from one of the hosts thereby having the system 510 coercing the hosts into re-registering device registrations. It should be noted that sending the foregoing check condition also causes the hosts to re-register on the new data storage system 512. After the hosts have re-registered their device reservations with the system 510, the system 510 may then return the contents of its reservation registration table to the requesting data storage system 512. The system 512 may then perform processing as described above to verify that all hosts accessing a first set of devices of system 510 (where the first set of devices are being migrated to a second set of devices of the system 512) also perform successful path detection for the second set of devices on system 512 (on all appropriate paths using target ports of 512). Such verification may be performed as described above in one embodiment using reservation registration information since reservation registration for such paths on the system 512 may occur only after the host has detected or recognized such paths.

It should be noted that the foregoing techniques may be used in an embodiment that does not use the reservation registration command as described herein. Rather, any mechanism may be used by a host to communicate information to each of the data storage systems 510, 512 what one or more paths are recognized and used by the host to access each device of the data storage systems 510, 512. Furthermore, as will be appreciated by those of ordinary skill in the art, the processing of verifying whether a host has successfully completed path detection or recognition on a particular data storage system may be used in connection with other processing besides data migration as described herein.

Figure 8:
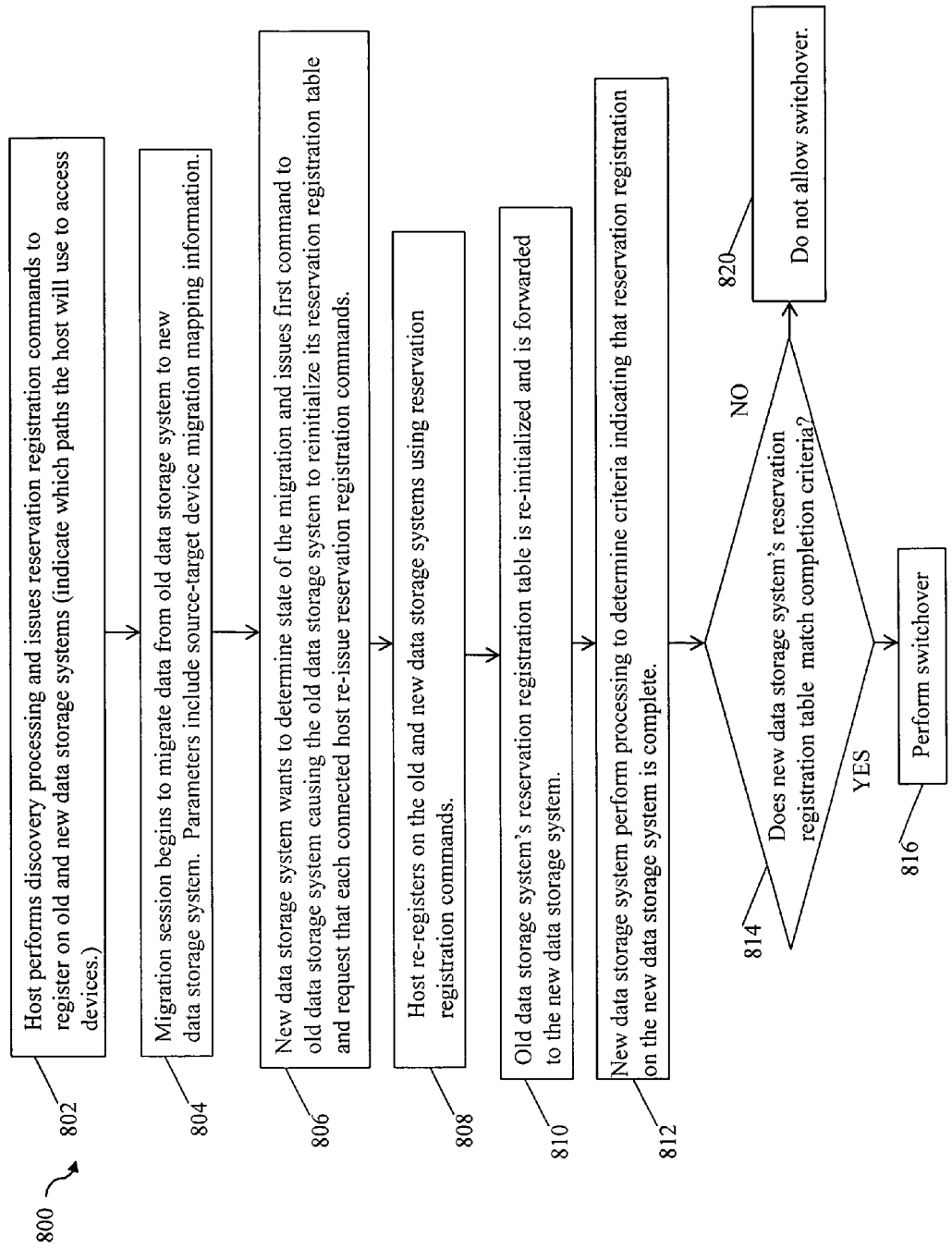
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 800 summarizes processing described above. It should be noted that the processing is described with respect to a single host however the processing may more generally be performed with respect to multiple hosts. Additionally, the processing is made with reference to new and old data storage systems in the context of the migration as described in connection with FIG. 5 above. At step 802, the host performs discovery processing and issues reservation registration commands to register paths for devices on the old and new data storage systems. The reservation registration information indicates which paths are recognized by the host and may be used by the host to access the devices. At step 804, a migration session may be commenced to migrate data from devices of the old to the new data storage system. Parameters for the migration session may indicate which old or source data storage system devices are copied to which devices (e.g., target devices) of the new data storage system. The parameters may indicate the information of 750 as illustrated in FIG. 7. At some later point in time, step 806 may be performed when the new data storage system wants to determine the state of the migration such as in connection with determining whether to perform switchover processing as described above. Step 806 may include the new data storage system issuing a first command to the old data storage system causing the old data storage system to reinitialize its reservation registration table and request that each connected host re-issue its reservation registration commands to the old system. As noted above, one way in which the old data storage system may cause hosts to re-register their device registrations is by sending a SCSI check condition message to all connected hosts. The check condition sent is one typically sent by the data storage system in response to performing a device reset. However, in this case, no such device reset has been performed (e.g. no device reset command has been received by the data storage system). However, the old data storage system is forcing the hosts to perform device re-registration by issuing the foregoing check condition message to all connected hosts. At step 808, the host re-registers on the old data storage system and also the new data storage system by reissuing reservation registration commands. At step 810, the old data storage system's reservation registration table is reinitialized and forwarded to the new data storage system. At step 812, the new data storage system performs processing to determine criteria indicating that the reservation registration on the new data storage system is completed. Step 812 may be performed using the reservation registration information returned by the old data storage system along with mapping information 740 and 750, and the current contents of the reservation registration table of the new data storage system. As described above, the criteria may indicate what device and path registrations are expected to represent that the host has completed device registration (and thus path detection) with respect to the new data storage system. The criteria is based on the fact that host registered on the source or old data storage system for source devices must also register for counterpart target device on the new data storage system. For each such target device, the host may be required to register for paths to the target device based on the one or more target ports over which the target device is visible to the host. At step 814, a determination is made as to whether the new data storage system's reservation registration table matches the completion criteria determined in step 812. If step 814 evaluates to no, the new data storage system does not perform switchover processing. If step 814 evaluates to yes, the new data storage system performs switchover processing. As described above, switchover processing may include processing to appropriately change path states from active to passive and vice-versa so that subsequent hosts requests for data are serviced using the target devices of the new data storage system rather than the source devices of the old data storage system.

Although the foregoing is described with purposes of illustration with respect to the SCSI standard and particular commands thereof, LUNs, and the like, the techniques herein are more generally applicable for use with other standards and protocols, commands, logical devices, and the like.

It should be noted the representation of a passive state as described herein with respect to a combination of path and LUN may be communicated from the data storage system to the host or other initiator in accordance with the ALUA. (Asymmetric Logical Unit Access) portion of the SCSI standard. However, the techniques herein may used in an embodiment which does not support ALUA.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of verifying host path detection comprising:
receiving first information from a first data storage system, said first information indicating a first set of one or more hosts and, for each host in the first set, which one or more devices of a first device set of the first data storage system are accessible to said each host in the first set over one or more associated paths to the first data storage system;
receiving second information at a second data storage system, wherein the second data storage system also receives the first information from the first data storage system, said second information indicating a second set of one or more hosts and, for each host in the second set, which one or more devices of a second device set of the second data storage system are accessible to said each host in the second set over one or more associated paths to the second data storage system, wherein each of said devices in the first device set has an associated device in said second device set; and
performing first processing at the second data storage system to determine whether each host included in the first set and also included in the second set has successfully completed path detection with respect to said second device set for the second data storage system, said first processing using information including the first information, the second information, first mapping information and second mapping information, the first mapping information indicating, for each device in the second device set, through which one or more ports of the second data storage system said each device in the second device set is accessible, and the second mapping information indicating, for each device in the first device set, an associated device in said second device set, and wherein prior to performing said first processing, each of one or more paths of a second path set for the second device set is in a passive state, said second path set identifying paths between hosts included in the first set and also included in the second set and target ports of the second data storage system, wherein each path in the second path set provides access to one of the devices in the second device set and is in said passive state thereby indicating that said each path of the second path set is not available for sending I/O operations to said one device and is available for sending host control operations to said one device.

2. The method of claim 1, wherein said first processing further comprises:
   determining, using the first information by the second data storage system, which devices in the first device set are accessible to each host in the first set; and
   traversing the second information to determine whether each host in the first set accesses a first device in the first device set and also accesses a second device of the second device set associated with the first device over one or more paths or ports of the second data storage system, wherein said one or more paths or ports are indicated in the first mapping information and the second mapping information indicates that the first device is associated with the second device.

3. The method of claim 1, wherein said first information and said second information are created as a result of a plurality of hosts included in the first set and also included in the second set issuing commands to said first data storage system and said second data storage system to perform discovery processing and to register with the first and the second data storage systems as using one or more paths to access one or more devices included in the first device set and the second device set.

4. The method of claim 3, wherein the commands issued to create said first information and said second information include reservation registration commands issued by the plurality of hosts to register with the first and the second data storage systems as using particular paths to access devices included in the first device set and the second device set.

5. The method of claim 4, wherein each of said reservation registration commands is a vendor unique SCSI command.

6. The method of claim 4, wherein each of the reservation registration commands includes a key used to uniquely identify a sending host.

7. The method of claim 4, wherein each of the reservation registration commands to register a first path to a first device of either said first device set or said second device set is performed by a host as part of processing to establish the first path as a recognized path for sending communications from said host to the first device.

8. The method of claim 1, wherein data from each device of the first device set is migrated to its associated device in the second device set as indicated by the second mapping information.

9. The method of claim 8, wherein said second mapping information is supplied using one or more parameters of a migration session.

10. The method of claim 1, wherein prior to the second data storage system receiving the first information from the first data storage system, the method further comprises:
    issuing a command from the second data storage system to the first data storage system instructing the first data storage system to initialize a table including the first information; and
    sending a message from the first data storage system to hosts of the first set causing the first set of hosts to re-register with the first data storage system as accessing one or more devices of the first set over one or more paths or ports of the first data storage system thereby creating a new instance of the first information in the table.

11. The method of claim 1, wherein, prior to performing said first processing, one or more paths of a first path set for said first set of devices are in an active state, said first path set identifying paths between hosts included in the first set and also in the second set and target ports of the first data storage system.

12. The method of claim 11, further comprising:
    migrating data from said first device set to the second device set;
    determining that each host included in the first set and also included in the second set has successfully completed path detection with respect to said second device set; and
    performing second processing to change paths of said first path set of to said passive state and paths of said second path set to said active state.

13. The method of claim 11, wherein a path to a first device which is included in any of the first device set and the second device set and which is in the active state indicates that the path is used to successfully process I/O operations directed to the first device.

14. The method of claim 1, wherein a determination by said first processing that a first host has successfully completed path detection with respect to the second device set thereby establishing one or more paths to each device in said second device set as recognized paths to said each device of the second set is in accordance with completion of one or more expected commands for path detection performed by the first host and in accordance with what one or more ports through which said each device of the second set is visible to said first host.

15. The method of claim 14, wherein said one or more expected commands are performed as part of initially configuring connectivity between said first host and the first and second data storage systems.

16. The method of claim 1, wherein said first set of devices and said second set of devices are logical devices.

17. A computer readable medium comprising code stored thereon for verifying host path detection, the computer readable medium comprising code for:
    receiving first information from a first data storage system, said first information indicating a first set of one or more hosts and, for each host in the first set, which one or more devices of a first device set of the first data storage system are accessible to said each host in the first set over one or more associated paths to the first data storage system;
    receiving second information at a second data storage system, wherein the second data storage system also receives the first information from the first data storage system, said second information indicating a second set of one or more hosts and, for each host in the second set, which one or more devices of a second device set of the second data storage system are accessible to said each host in the second set over one or more associated paths to the second data storage system, wherein each of said devices in the first device set has an associated device in said second device set; and
    performing first processing at the second data storage system to determine whether each host included in the first set and also included in the second set has successfully completed path detection with respect to said second device set for the second data storage system, said first processing using information including the first information, the second information, first mapping information and second mapping information, the first mapping information indicating, for each device in the second device set, through which one or more ports of the second data storage system said each device in the second device set is accessible, and the second mapping information indicating, for each device in the first device set, an associated device in said second device set, and wherein prior to performing said first processing, each of one or more paths of a second path set for the second device set is in a passive state, said second path set identifying paths between hosts included in the first set and also included in the second set and target ports of the second data storage system, wherein each path in the second path set provides access to one of the devices in the second device set and is in said passive state thereby indicating that said each path of the second path set is not available for sending I/O operations to said one device and is available for sending host control operations to said one device.

18. The computer readable medium of claim 17, wherein said code for first processing further comprises code for:
  determining, using the first information by the second data storage system, which devices in the first device set are accessible to each host in the first set; and
  traversing the second information to determine whether each host in the first set accesses a first device in the first device set and also accesses a second device of the second device set associated with the first device over one or more paths or ports of the second data storage system, wherein said one or more paths or ports are indicated in the first mapping information and the second mapping information indicates that the first device is associated with the second device.

19. The computer readable medium of claim 17, wherein said first information and said second information are created as a result of a plurality of hosts included in the first set and also included in the second set issuing commands to said first data storage system and said second data storage system to perform discovery processing and to register with the first and the second data storage systems as using one or more paths to access one or more devices included in the first device set and the second device set.

* * * * *